(12) United States Patent
Arlt et al.

(10) Patent No.: US 6,360,868 B1
(45) Date of Patent: Mar. 26, 2002

(54) UNIT LOAD TRANSPORT DEVICE

(75) Inventors: Günter E. Arlt, Rheda-Wiedenbrück; Andreas Hintz, Beckum, both of (DE)

(73) Assignee: Beumer Maschinenfabrik GmbH & Co KG, Beckum (DE)

( * ) Notice: Subject to any disclaimer, the term of this patent is extended or adjusted under 35 U.S.C. 154(b) by 0 days.

(21) Appl. No.: 09/539,302

(22) Filed: Mar. 30, 2000

(30) Foreign Application Priority Data

Mar. 30, 1999 (DE) .......................................... 199 14 386

(51) Int. Cl.[7] .............................................. B65G 47/10
(52) U.S. Cl. .................................. 198/370.06; 198/852
(58) Field of Search ............................ 198/370.06, 835, 198/804, 780, 852

(56) References Cited

U.S. PATENT DOCUMENTS

| 2,319,617 A | * | 5/1943 | Manierre | ..................... 198/852 |
| 3,807,548 A | | 4/1974 | Bergeron | |

FOREIGN PATENT DOCUMENTS

| DE | 1 685 557 | 6/1952 |
| DE | 1 049 302 | 1/1959 |
| DE | 2 300 202 | 7/1973 |
| EP | 0 680 898 | 11/1995 |
| EP | 0 700 844 | 3/1996 |
| EP | 0 739 831 | 10/1996 |
| EP | 0 768 252 | 4/1997 |
| WO | WO 97/39966 | 10/1997 |

* cited by examiner

Primary Examiner—Kenneth W. Noland
(74) Attorney, Agent, or Firm—Knobbe, martens Olson & Bear, LLP.

(57) ABSTRACT

A transport device for transporting unit loads, wherein unit load parts being respectively deposited onto a transport element in a depositing station and laterally discharged from the transport device. Commonly driven transport elements are arranged behind one another in the transport direction and connected to one another in an articulated fashion forming a closed transport path. The transport elements of the transport path respectively form a carrying surface with the outer face of the upper section of the belt conveyor. The transport belt of the transport path which can be transversely driven in a controlled fashion is driven from a non-driven transport position within the region of the respective delivery station in such a way that the unit load part which is supported by the respective belt conveyor and transported in the transport direction of the transport device is transported and delivered to the predetermined delivery station. The transport elements are respectively provided with a horizontal support plate that covers an intermediate space at the edge of its support surface. Each transport element is only provided with a support plate on one transverse edge that extends perpendicular to the transport direction of the transport device. The support plate of a transport element extends into the region of the adjacent transport element in the transport direction to such a degree that the support plate is overlapped by the adjacent transport element.

17 Claims, 10 Drawing Sheets

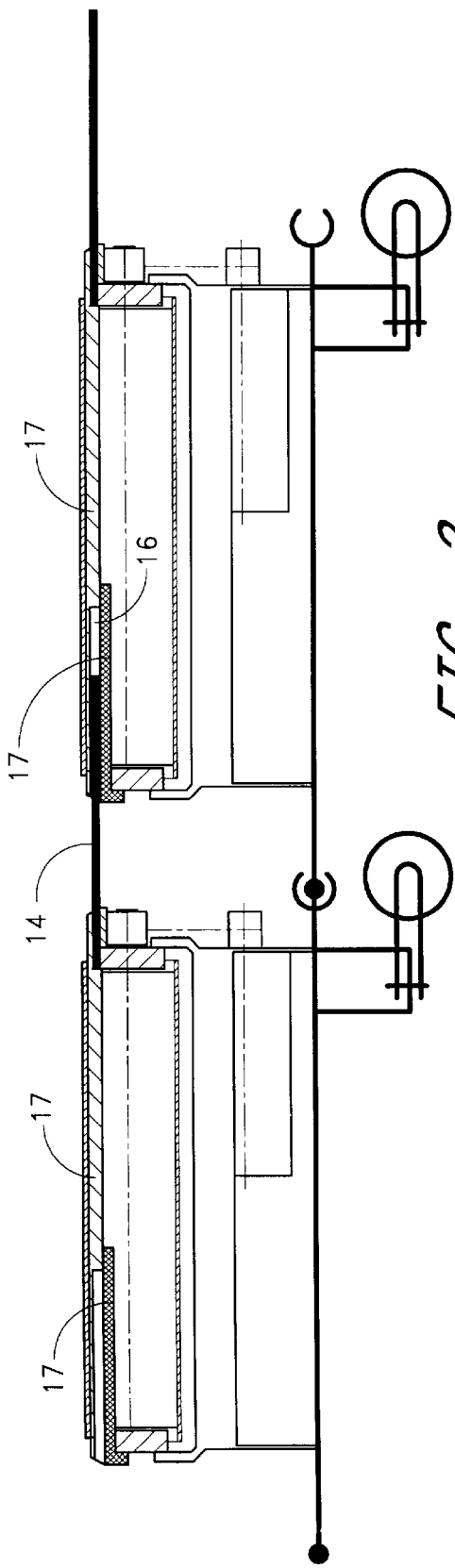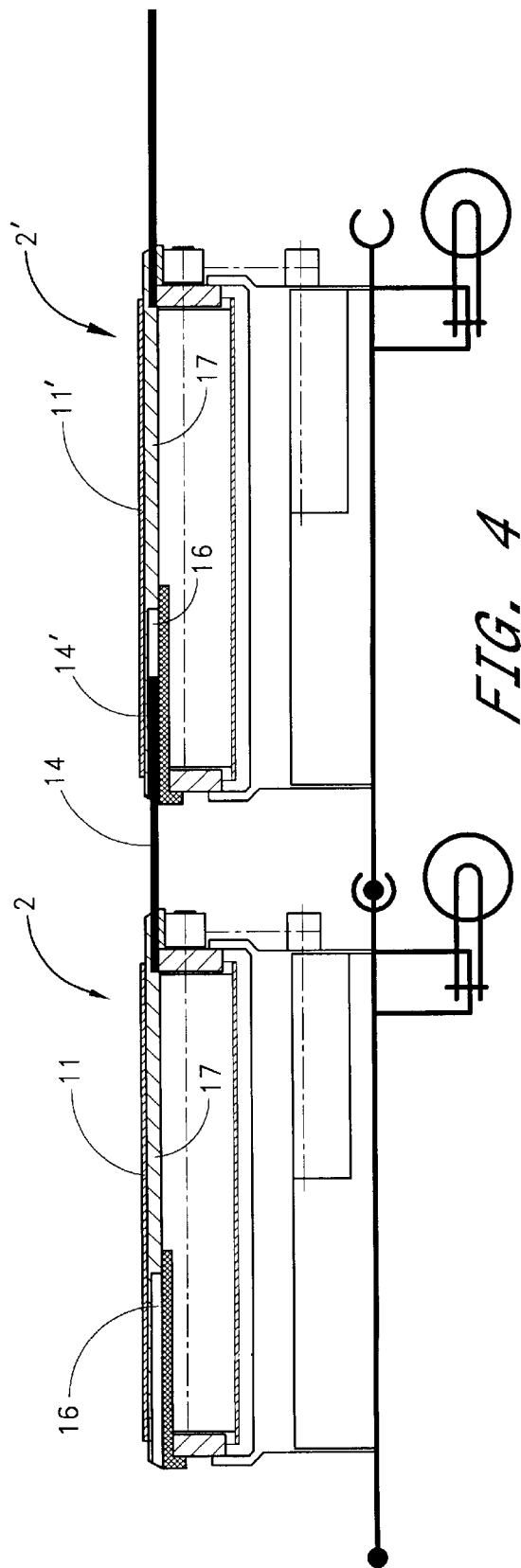

Figure 1:
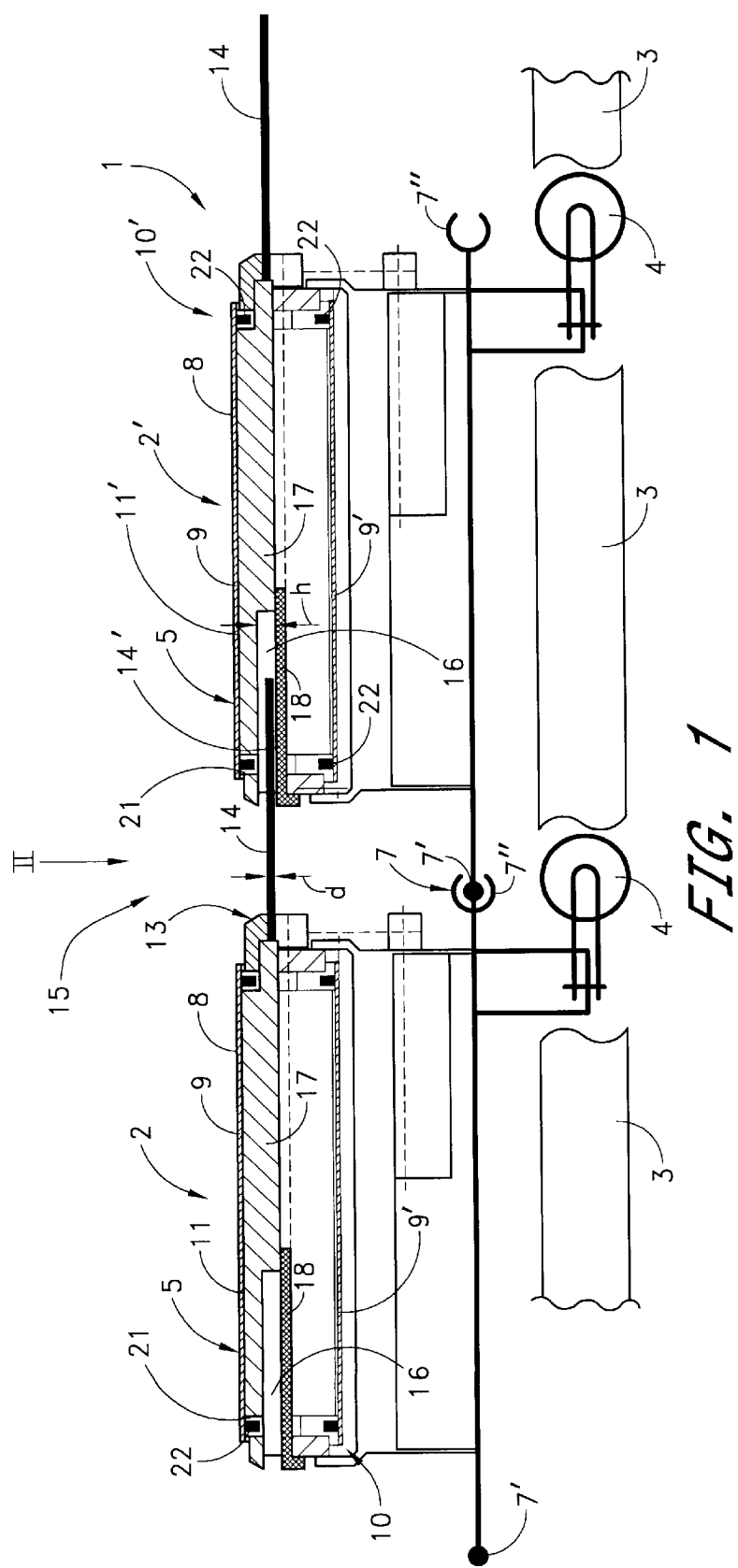

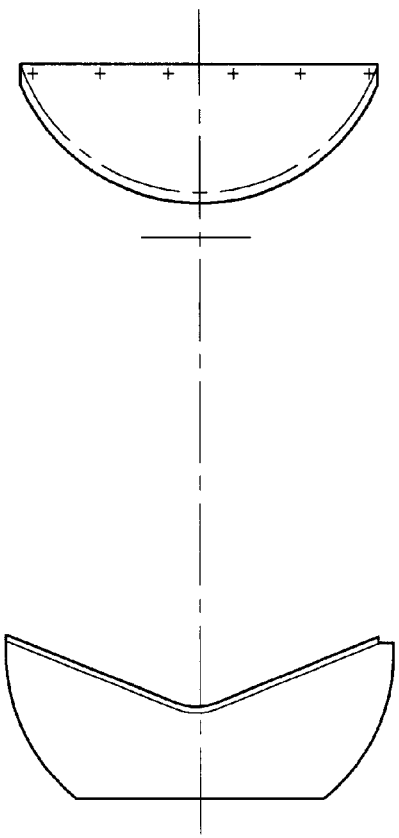
FIG. 15
FIG. 14
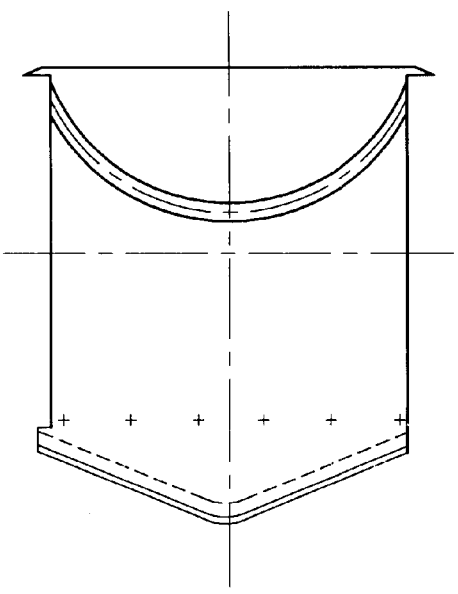
FIG. 13

UNIT LOAD TRANSPORT DEVICE

The present invention pertains to a transport device that can be categorized as a continuous transport device and is realized in the form of a rail line for transporting unit loads, in particular, in the form of a crossbelt sorter for sorting unit load parts, e.g., pieces of luggage, or for a backtrack transport system, with the unit load parts being respectively deposited (in general individually) onto a receptacle space formed by at least one transport element with a (if so required two-part) support or carrying surface in at least one depositing station and laterally discharged from the transport device essentially transverse to the transport direction at a delivery station (if so required one predetermined or selected delivery station of several delivery stations), with a plurality of commonly driven transport elements that are arranged behind one another in the transport direction and connected to one another in an articulated fashion, namely at least in pairs or groups, forming a closed transport path that extends horizontally and/or vertically along a guide, with the transport elements of the transport path respectively forming a carrying surface with the outer side of the upper section of the (transverse) belt conveyor, with the transport belt of the transport path which can be driven in a controlled fashion transverse to the transport direction of the transport device being driven from a non-driven transport position within the region of the (respectively provided) delivery station in such a way that the unit load part which is supported by the respective (transverse) belt conveyor and transported in the transport direction of the transport device is transported to the predetermined delivery side and delivered to the predetermined delivery station by the transport device, with the transport elements being respectively provided with an essentially horizontal support plate or the like that is directed in the transport direction of the transport device at the edge of its support surface that faces the trailing and the leading transport element, with the support surface essentially being formed by the upper section of the (transverse) belt conveyor, and with said support plates at least essentially covering the gap-shaped intermediate space between the two transport elements in question.

One example of such a unit load transport device is known from EP 0 739 831 A2. In this known transport device, support plates extend from each edge of each transport element which extends transverse to the transport direction and faces the trailing and the leading transport element, namely parallel to the support surface that is respectively formed by the upper section of one (transverse) belt conveyor. In this case, the two support plates which are essentially realized in the form of isosceles triangles are arranged at different heights on the frame of the (transverse) belt conveyor in such a way that they respectively overlap the adjacent support plate of the adjacent support element or are overlapped by this adjacent support plate.

In this context, it should also be mentioned that the tip of each essentially triangular support plate which respectively faces an adjacent transport element ends at a distance from the adjacent transport element in question.

In another transport device of this type which is known from EP 0 700 844 B1, significant intermediate spaces that essentially have a triangular shape when viewed from the top are formed in the horizontal curves of the transport path between two respectively adjacent transport elements. In the transport mode, unit load parts or parts or sections of the transported unit load parts (e.g., straps of backpacks or the like when transporting luggage) may drop through or into the intermediate spaces such that the unit load parts may be clamped between the respective transport elements on a straight section that follows a curved transport path section in a horizontal curve, i.e., problems/malfunctions or damages to the unit load part and/or the transport device may occur at the delivery station. In the transport device according to EP 0 739 831 A2, this risk is significantly reduced because a (significant) enlargement of the triangular gap between two adjacent transport elements which exists anyhow during a linear transport inevitably occurs in a curved transport section of a horizontal curve on the outer arc of the curved transport path. This triangular gap exists on each transport element despite the two support plates.

The present invention is based on the objective of improving the transport devices of the initially mentioned type and, in particular, eliminates the previously mentioned disadvantages such that no (or at least no significant) intermediate space exists between respectively adjacent transport elements, namely not even in horizontal curves with a relatively small curvature radius.

According to the invention, this objective is attained due to the fact that each transport element is only provided with a support plate on one transverse edge that essentially extends perpendicular to the transport direction, and the fact that the support plate of a transport element extends so far into the region of the adjacent transport element viewed in the transport direction of the transport device that the adjacent transport element is overlapped by the support plate.

According to one preferred embodiment of the present invention, the support plate of a transport element is overlapped by the (transverse) belt conveyor of the adjacent transport element, preferably so far that an essentially complete overlap is achieved even in horizontal curves with the smallest curvature radius.

Various embodiments may be considered for realizing the object of the invention. A first variation proposes that the section of a support plate which is overlapped or covered or "spanned" by the (transverse) belt conveyor of the adjacent transport element is arranged between the upper section and the lower section of the (transverse) belt conveyor in question. In this embodiment, the overlapped section of the support plate may extend into a (receptacle) pocket of the adjacent transport element.

In this case, the (receptacle) pockets are preferably realized in the shape of a gap and essentially arranged horizontally. It is practical that the height of the (receptacle) pocket is only slightly larger than the thickness of the support plate within the region of its overlapping section.

In an embodiment, in which the upper section of the (transverse) belt conveyor of a transport element is respectively supported in a sliding fashion on a support sheet metal, it is preferred that the (receptacle) pocket of the adjacent transport element be arranged in this support plate.

In this context, different practical embodiments are conceivable. For example, the (receptacle) pocket may be limited by the support sheet metal on its underside and on its upper side, i.e., the support sheet metal is realized in the shape of a pocket at least within the region of the support plate receptacle.

Another option consists of limiting the underside of the (receptacle) pocket with the underside of the upper section of the (transverse) belt conveyor.

According to another embodiment that—depending on the respective application—is also quite practical, the (receptacle) pocket is limited by the support sheet metal on its upper side and by a plate-shaped support element that is rigidly arranged on the adjacent transport element on its underside.

At this point, it should be expressly noted that the term "support sheet metal" generally refers to a component of sheet metal (i.e., metal), but a metallic material is by no means obligatory. On the contrary, a "support sheet metal" may, if so required, also consist of a suitable plastic material or another suitable material.

According to another embodiment of the present invention, the upper side of the support plate may contain at least one groove-shaped recess for accommodating an oblong guide element, e.g./in particular, a V-belt, that extends transverse to the transport direction of the transport device and in the transport direction of the (transverse) belt conveyor. If only one guide element is provided, it is particularly practical to arrange this guide element—viewed in the transport direction—on the end section of the transport element, on which no (receptacle) pocket is provided.

In order to allow the utilization of the transport device according to the invention on a transport path with vertical transport sections, the support plates may, if so required, be realized elastically and, for example, consist of a (preferably reinforced) rubber material or the like or of a sheet metal (in particular, sheet steel).

Preferred embodiments of the present invention are disclosed in the subclaims.

Figure 2:
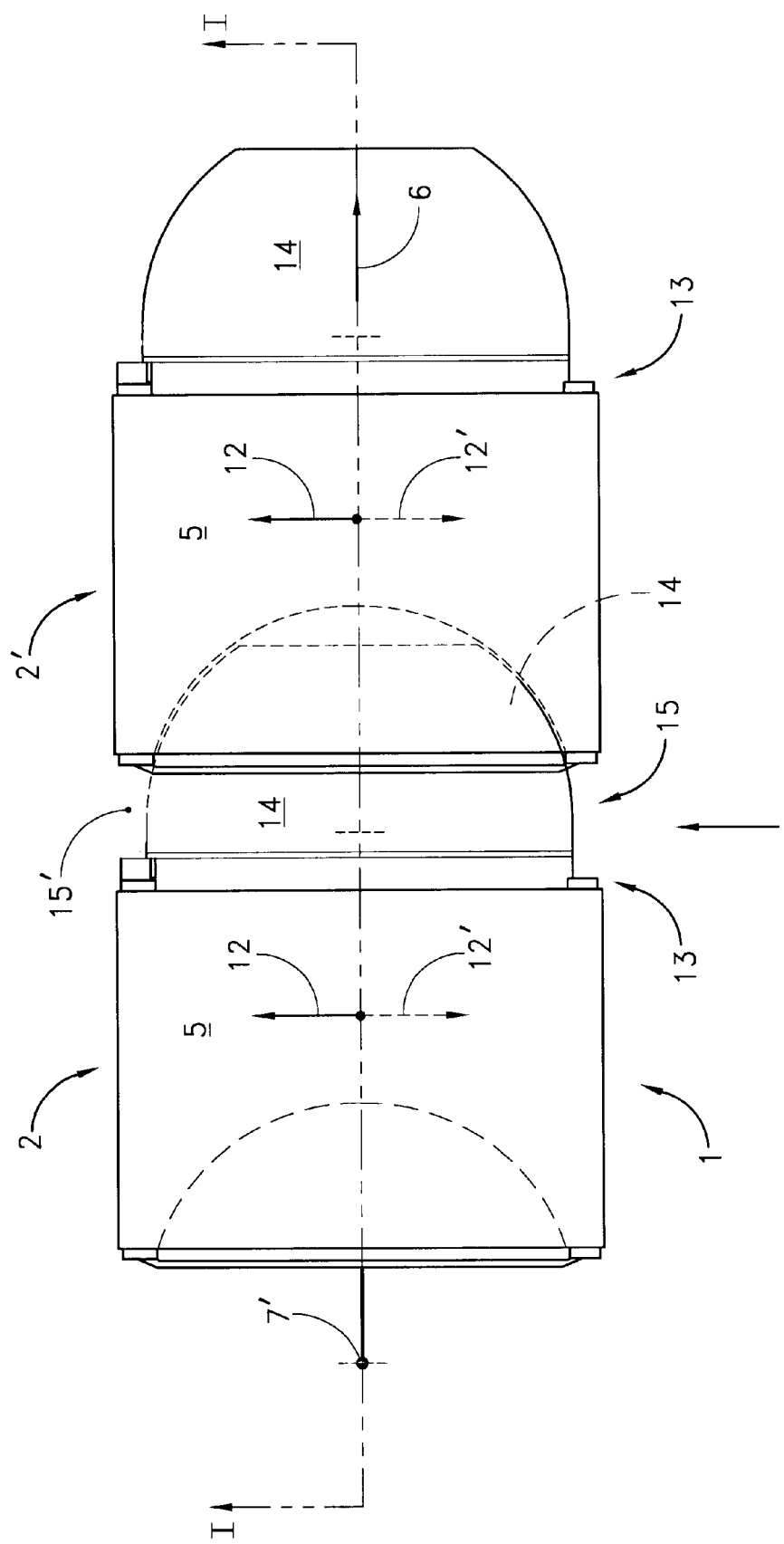
Figure 5:
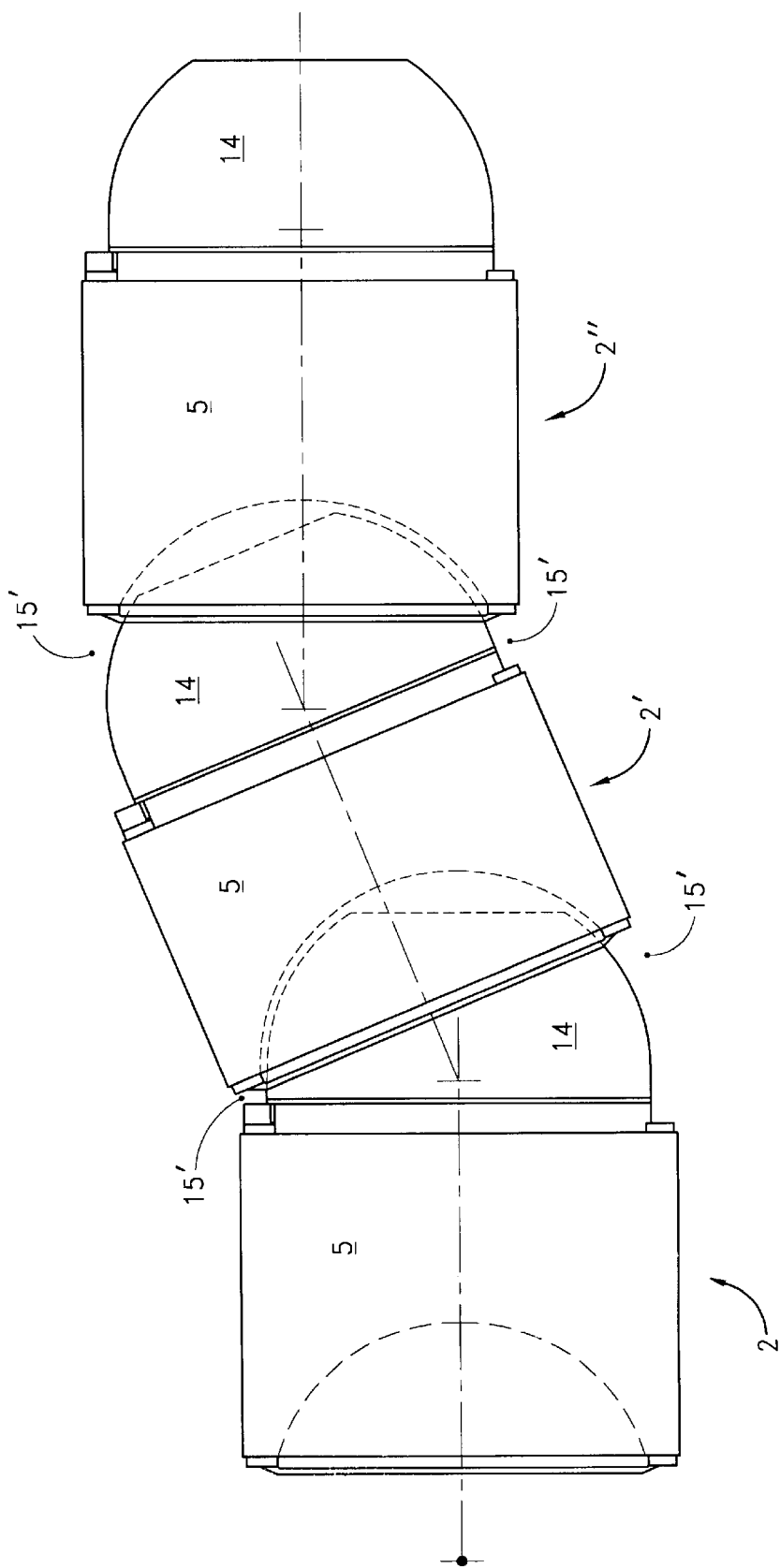
Figure 6A:
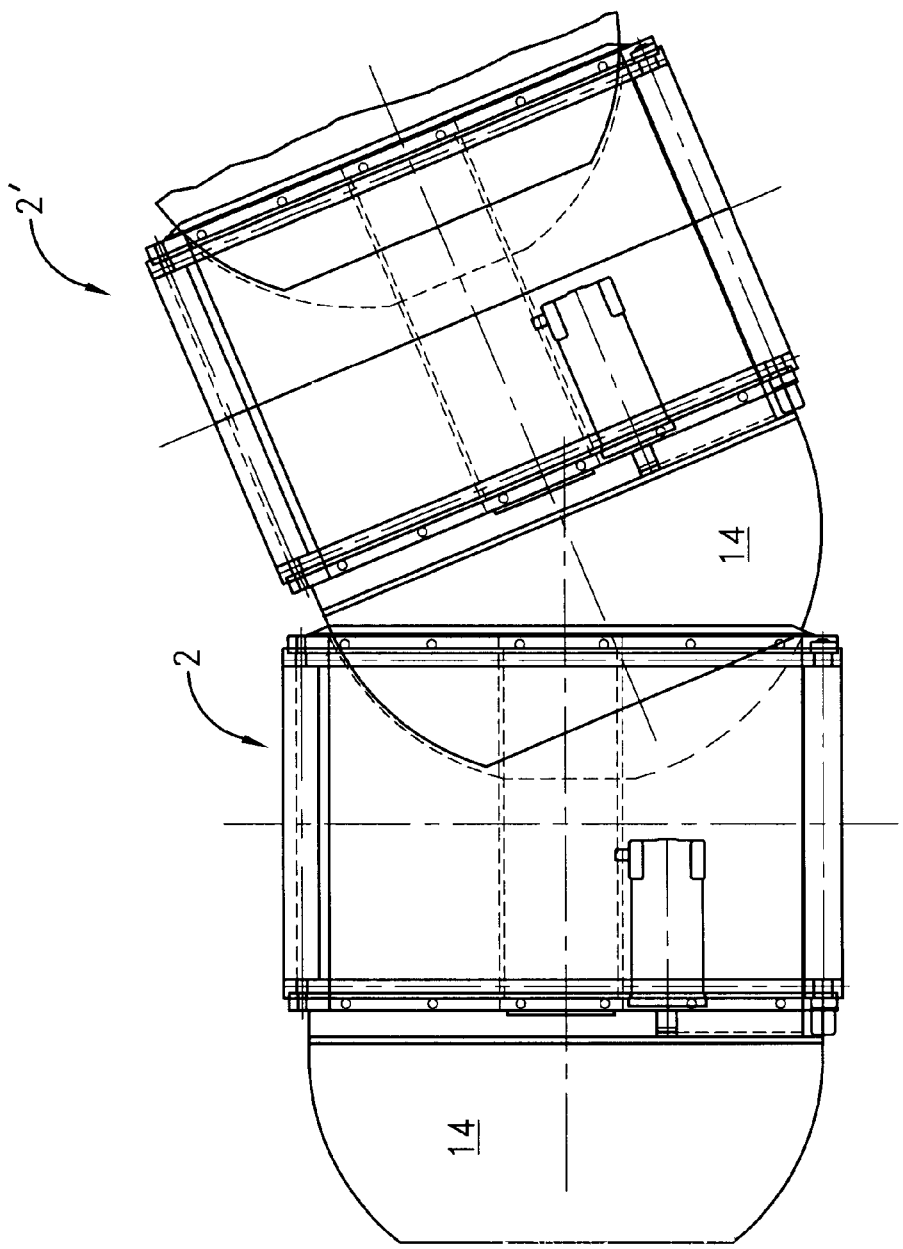
Figure 6B:
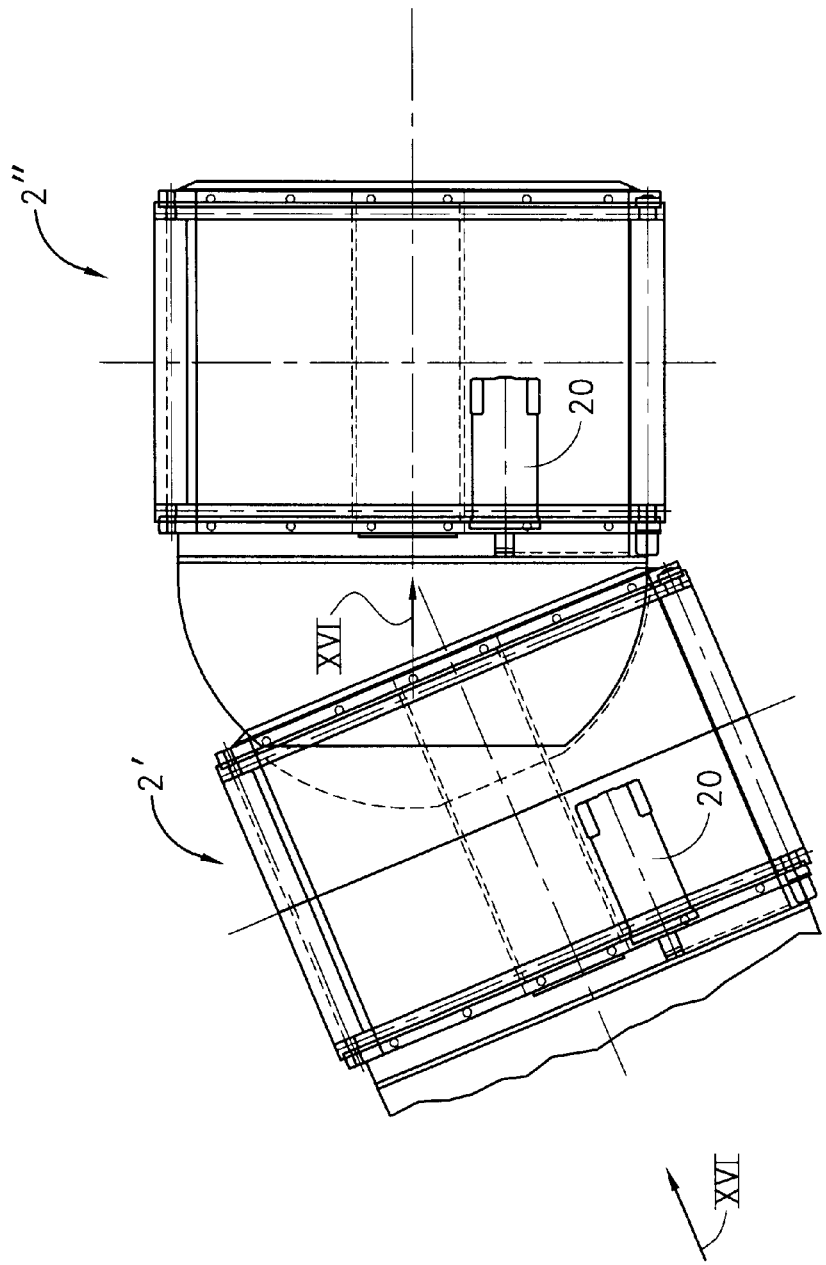
Figure 7:
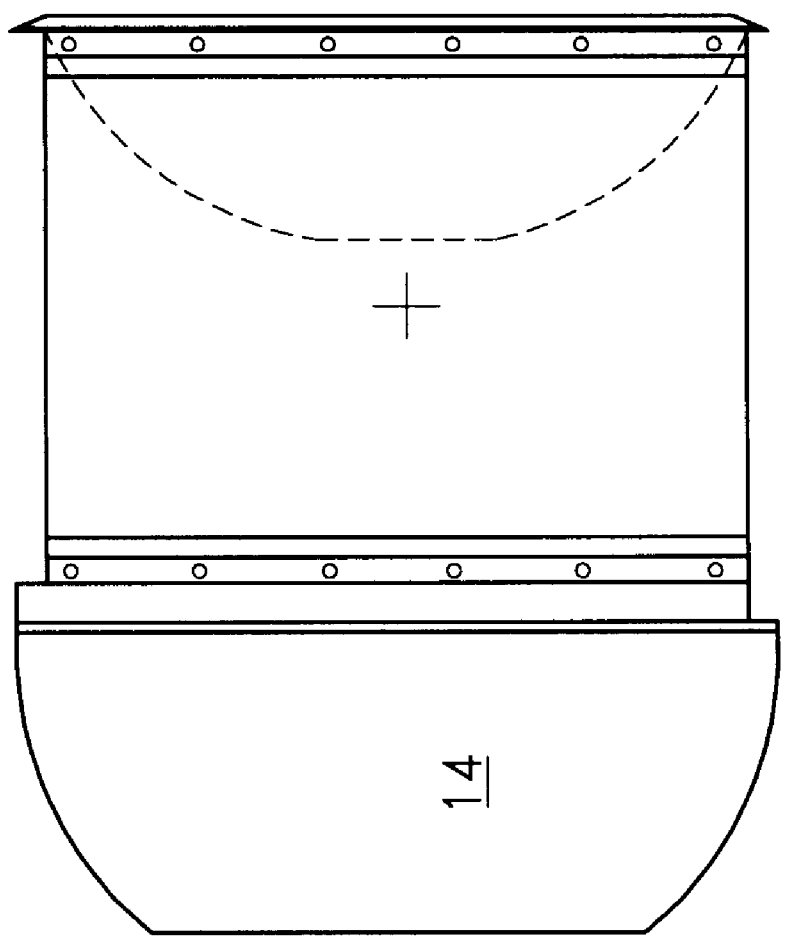
Figure 10:
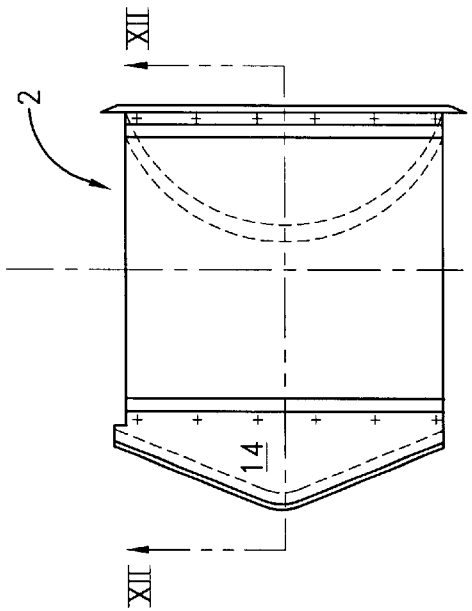
Figure 11:
Figure 12:
Figure 8:
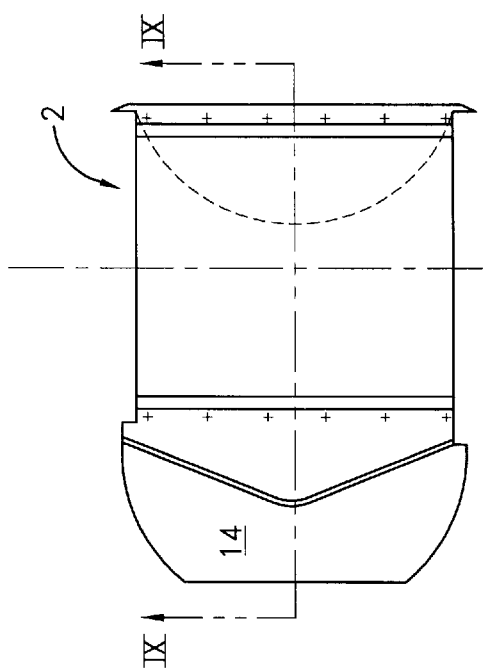
Figure 9:
Figure 16:
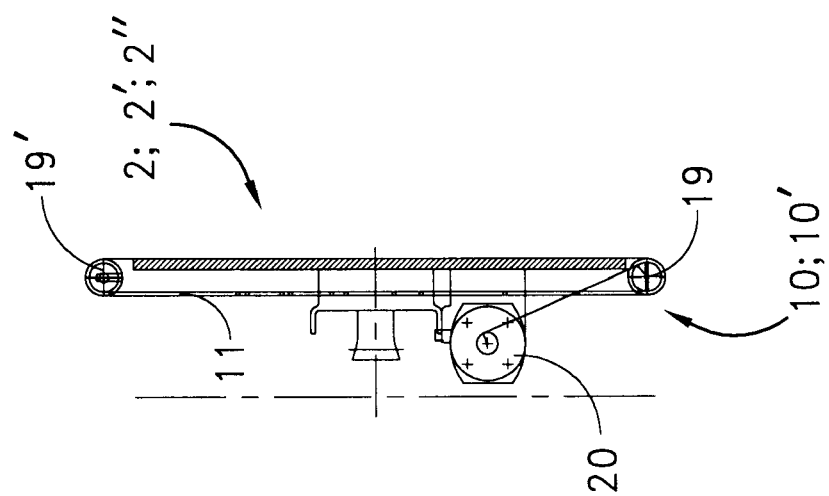

The invention is described in greater detail below with reference to the embodiments illustrated in the figures. The figures show:

FIG. 1, a schematic partial view of a transport device according to the invention (or, more specifically, of two adjacent transport elements), with the schematic partial view being partially sectioned viewed in the direction of the arrow I—I in FIG. 2;

FIG. 2, a top view of the arrangement shown in FIG. 1 viewed in the direction of the arrow II in FIG. 1;

FIG. 3, a variation of the invention in the form of a representation according to FIG. 1;

FIG. 4, another variation of the invention in the form of a representation according to FIGS. 1 and 3;

FIG. 5, a partial top view of a section of a transport device according to the invention which consists of three adjacent transport elements, namely within the region of a horizontal S-curve;

FIG. 6a, the two transport elements that are schematically illustrated in the left portion of FIG. 5 in a more detailed representation that is slightly enlarged in comparison to FIG. 5;

FIG. 6b, a representation of the two transport elements shown in the right portion of FIG. 5 in the form of a representation that corresponds to FIG. 6a;

FIGS. 7–15, details of the transport elements according to the invention, some of which are realized differently, and FIG. 16, a view of a transport element according to FIG. 6b in the transport direction which is partially sectioned viewed in the direction of the arrow XVI in FIG. 6b, in particular, the (transverse) belt conveyor of a transport element that is realized in the form of a so-called crossbelt.

FIGS. 1 and 2 show (schematically so as to better elucidate) a section of a transport device 1 according to the invention for transporting not-shown unit load parts, with said section consisting of two transport elements 2. Since the transport elements 2 are guided on a rail 3 with rollers 4 which follows the predetermined transport path or defines this transport path, such a transport device is also referred to as a so-called rail line.

The transport device 1 according to the invention can be advantageously utilized for numerous and very different transport tasks, e.g., for sorting unit load parts (e.g., pieces of luggage at an airport) or for a so-called backtrack transport system.

In any case, the unit load parts to be transported are respectively deposited (in general individually) onto the transport device 1 at a not-shown depositing station (if so required, two or more depositing stations may be provided, in particular, in sorters), namely onto a carrying or support surface 5 that is formed by at least one transport element 2 (with no more than two adjacent transport elements 2 usually being utilized as a carrying surface 5 or receptacle space for a unit load part in a sorter; for other transport tasks, the receptacle space/carrying surface 5 for a unit load part may, if so required, also be formed by more than two transport elements 2).

A unit load part deposited at a depositing station is essentially delivered laterally by the transport device 1, i.e., transverse to the transport direction 6, at a delivery station (in a sorter, this may pertain to one predetermined or selected delivery station of several delivery stations).

The entire transport path consists of a plurality of commonly driven transport elements 2 that are arranged behind one another in the transport direction 6 and connected to one another in an articulated fashion, namely at least in pairs or groups. These transport elements form a closed transport path that extends horizontally and/or vertically along the (rail) guide 3. One such articulation 7 is shown in FIG. 1. Depending on the progression of the transport path, this articulation may consist of a cardan joint or a ball joint; in the latter instance, the joint consists of a spherical head 7' and a spherical socket 7".

The drive that preferably consists of a linear drive is realized in the form of a conventional drive unit not illustrated in the figures for reasons of better intelligibility.

The carrying surface 5 of each transport element 2 is formed by the outer side 8 of the upper section 9 of a (transverse) belt conveyor 10, e.g., as known from EP 0 393 773 B1 in the form of a so-called crossbelt conveyor. In this case, the conveyor belt 11 of each belt conveyor 10 that essentially forms one transport element 2 is at a standstill during the transport, with the outer side 8 of the upper section 9 forming the carrying surface 5. The conveyor belt 11, whose transport directions 12 and 12' extend transverse to the transport direction 6 of the transport device 1, can be driven in a controlled fashion, namely such that it is driven from its non-driven transport position within the region of the respectively provided depositing station in such a way that the unit load part which is supported by the respective (transverse) belt conveyor 10 and transported in the transport direction 6 of the transport device 1 is transported to the predetermined delivery side and delivered by the transport device 1 at the predetermined delivery station either in the direction of the arrow 12 or in the direction of the arrow 12'.

The transport elements 2 are respectively provided with a horizontal support plate 14 that is directed in the transport direction 6 of the transport device 1 on the edges 13 of their carrying surface 5 (which is essentially formed by the upper section 9 of its (transverse) belt conveyor 10), with said edges respectively facing the trailing and the leading transport element 2. These support plates essentially cover the gap-shaped intermediate space 15 (except for insignificant edge sections 15') between the two transport elements 2, 2 in question.

According to the invention, each transport element 2 only contains a support plate 14 on one transverse edge 13 that essentially extends transverse or perpendicular to the transport direction 6 of the transport device 1. This support plate extends into the region of the adjacent transport element 2' in the transport direction 6 of the transport device 1 to such a degree that the support plate is overlapped by the transport element, namely by the (transverse) belt conveyor 10' of the adjacent transport element 2', and such that an essentially complete overlap also exists in the horizontal curves of the transport path which have the smallest curvature radius, i.e., in the curves where the largest (essentially triangular) gap-shaped intermediate spaces 15 occur.

Consequently, the design according to the invention ensures—despite existing horizontal curves and, if applicable, vertical curves—that an essentially closed transport path or carrying plane is always provided, i.e., that the above-mentioned disadvantages inherent to the state of the art are eliminated. This is achieved in a most practical fashion—e.g., in contrast to the conveyor according to EP 0 739 831 A2—with only one support plate 14 per transport element 2.

In the exemplary embodiment shown in FIGS. 1 and 2, the section 14' of the support plate 14 which is overlapped by the (transverse) belt conveyor 10' of the adjacent transport element 2' is arranged in a (receptacle) pocket 16 that is limited by the support sheet metal 17 for the conveyor belt 11 on its upper side and by a plate-shaped support element 18 that is rigidly arranged on the adjacent transport element 2' on its underside.

Generally speaking, the section of the support plate 14 arranged on the trailing transport element 2 which is overlapped by the (transverse) belt conveyor 10' of the adjacent transport element 2' is arranged between the upper section 9 and the lower section 9' of the (transverse) belt conveyor 10' in question, with the (receptacle) pocket 16 having the shape of a gap and being arranged such that it extends parallel to the carrying surface 5. In this case, the height h of a pocket 16 is only slightly larger than the thickness d of the assigned support plate 14 within the region of its overlapping section 14' which always has the same size in all embodiments shown.

Since it is practical in crossbelt conveyors of this type to support the upper section 9 (and consequently the transported/supported unit load part) on a support sheet metal 17 in a sliding fashion, the pocket 16 may—as described above—be arranged or situated in the support sheet metal 17 (if the support sheet metal 17 has corresponding dimensions). The pocket may—in contrast to the embodiment according to FIG. 1—be limited by the support sheet metal 17 on its underside as well as on its upper side as indicated in FIG. 3. In this context, it should also be mentioned that the cross-hatched lower section of the support sheet metal 17 which is formed by a separate plate-shaped support element 18 in the embodiment according to FIG. 1 represents an integral or mounted component of the support sheet metal 17. In other respects, the design according to FIG. 3 corresponds to the design according to FIG. 1:

FIG. 4 shows another variation, in which the (receptacle) pocket 16 is limited by the support sheet metal 17 on the underside and by the underside of the upper section 9 of the (transverse) belt conveyor 10' or its conveyor belt 11' on the upper side.

FIG. 5 shows a top view of three transport elements 2 within the region of an S-shaped horizontal curve which corresponds to the representation according to FIG. 2 (but is illustrated slightly smaller than in FIG. 2). One can ascertain that the intermediate space 15 between two adjacent transport elements 2, 2' and 2', 2" is negligibly small, namely even at the maximum pivoting angle of two adjacent transport elements in a horizontal curve (i.e., a horizontal curve with approximately the smallest possible curvature radius). Only the entirely uncritical edge sections 15' contain an extremely small "intermediate space" 15 that, however, is essentially only as large as on linear transport sections.

FIGS. 6a and 6b show the two left and two right transport elements 2, 2' of the embodiment shown in FIG. 5, namely in the form of a slightly enlarged representation of a more complicated construction. In this case, the support plates 14 respectively extend to the other side, i.e., the transport direction 6 is reversed in comparison to the arrow shown in FIG. 2.

FIGS. 7–15 show constructive details of the representation according to FIGS. 6a, 6b. A person skilled in the art should be easily able to comprehend these details, i.e., a separate description is not provided.

Regarding FIG. 16, it should be noted once again that this figure shows a view of a transport element 2 or 2' or 2" in the direction of the arrow XVI in FIG. 6b. In this representation, the conveyor belt 11 as well as the deflection rollers 19, 19' of the (transverse) belt conveyor 10 and 10' are shown, with this figure also indicating that the deflection roller 19 can be driven by a controllable drive 20.

With reference to, in particular, FIG. 1, it should be mentioned that the upper side of the support plate 14 contains a preferably groove-shaped recess 21 for accommodating an oblong guide element 22 similar to a V-belt or the like, with said groove-shaped recess extending transverse to the transport direction 6 of the transport device 1 and in the transport direction 12, 12' of the (transverse) belt conveyor 10 or 10'. This guide element is frictionally engaged with the backing side of the conveyor belt 9 (i.e., the underside of the upper section 8).

It should also be mentioned that closed (receptacle) pockets 16 as they are used in the embodiments according to FIGS. 1 and 3 are, in principle, subject to the risk of jamming the support plate 14, in particular, due to a soiling of the pocket 16 after an extended operating time and/or a deformation of the pocket cover situated above the section 14' of the support plate 14. This is not possible in the embodiment according to FIG. 4, in which the conveyor belt 11 and 11' forms the upper cover or overlap for the section 14 of the support plate 14 in question, namely because the pockets 16 are open toward the conveyor belt 10 and 10' in this case. In addition, this variation can also be manufactured less expensively.

With reference to the above-mentioned V-belt 22, it should also be mentioned that this belt is preferably arranged on the edge of the transport element 2 or 2' on which no support plate 14 is mounted (if only one V-belt is provided). FIG. 1 also indicates that each transport element 2 or 2' or 2" may also be provided with two (or, if so required, more) V-belts 22.

It should also be mentioned that the support plates 14 do not necessarily have to be realized in an essentially rigid fashion, but may advantageously consist of a thin sheet metal or a reinforced rubber-like material as in the embodiment according to FIG. 1. In this case, the support plates can be elastically deformed in vertical curves such that the transport device according to the invention may also be used in instances, in which the transport path not only contains horizontal curves, but also vertical curves.

| List of reference symbols | |
| --- | --- |
| 1 | Transport device |
| 2; 2'; 2" | Transport elements |
| 3 | Rail |
| 4 | Rollers |
| 5 | Carrying surfaces |

-continued

List of reference symbols

| | |
|---|---|
| 6 | Arrow (transport direction of 1) |
| 7 | Joint |
| 7' | Spherical head |
| 7" | Spherical socket |
| 8 | Outer side (of 9) |
| 9 | Upper section (of 10 and 11) |
| 9' | Lower section (of 10 and 11) |
| 10; 10' | (Transverse) belt conveyor |
| 11, 11' | Conveyor belt (of 10) |
| 12; 12' | Transport direction (of 10) |
| 13 | Transverse edge |
| 14 | Support plate |
| 14' | Overlapped section (of 14) |
| 15 | Intermediate space (between 2/2) |
| 15' | Edge section (of 15) |
| 16 | (Receptacle) pocket |
| 17 | Support sheet metal (for 11) |
| 18 | Plate-shaped support element |
| 19; 19' | Deflection rollers (of 10; 10') |
| 20 | Drive (for 19) |
| 21 | Groove-shaped recess (in 14) |
| 22 | Guide element (V-belt). |

What is claimed is:

1. A transport device in the form of a rail line for transporting unit loads along a transport direction, comprising:
  a belt conveyor having a lower section and an upper section with an outer surface; and
  a plurality of commonly driven transport elements arranged in series in transport direction and connected to one another in an articulated fashion and at least in pairs forming a closed transport path that extends along a guide, with the unit loads being respectively deposited onto a receptacle space formed by at least one transport element with a carrying surface in a depositing station and laterally discharged from the transport device at a delivery station, the transport elements of the transport path respectively forming a carrying surface with the outer surface of the upper section of the belt conveyor, and a transport belt of the transport path being driven in a controlled fashion transverse to the transport direction of the transport device from a non-driven transport position within a region of the respective delivery station in such a way that the unit load part which is supported by the respective belt conveyor and transported in the transport direction of the transport device is transported and delivered to the predetermined delivery station, each transport element having an essentially horizontal support plate that is directed in the transport direction at an edge of its support surface that faces the trailing or the leading transport element, the support plates at least essentially covering an intermediate space between the two adjacent transport elements, wherein each transport element is only provided with a support plate on one transverse edge that essentially extends perpendicular to the transport direction of the transport device, and wherein the support plate of a transport element extends into a region of the adjacent transport element in the transport direction to such a degree that the support plate is overlapped by the adjacent transport element.

2. The transport device of claim 1, wherein the support plate is overlapped by the belt conveyor of the adjacent transport element.

3. The transport device of claim 2, wherein the support plate of each transport element is overlapped to such a degree that an essentially complete overlap and consequently an essentially closed carrying surface is formed in horizontal curves with a small curvature radius.

4. The transport device of claim 3, wherein a section of a support plate which is overlapped by the belt conveyor of the adjacent transport element is between the upper section and the lower section of the belt conveyor.

5. The transport device of claim 4, wherein the overlapped section of the support plate respectively is in a pocket of the adjacent transport element.

6. The transport device of claim 5, wherein the pocket is shaped as a gap and arranged essentially parallel to the carrying surface, and wherein a height of the pocket is only slightly larger than a thickness of the support plate within the region of its overlapped section.

7. The transport device of claim 5, wherein the upper section of the belt conveyor of a transport element is supported in a sliding fashion on a support sheet metal, and wherein the pocket of the adjacent transport element is arranged in its support sheet metal.

8. The transport device of claim 7, wherein the pocket is limited by the support sheet metal on its underside and its upper side.

9. The transport device of claim 7, wherein the pocket is limited by the support sheet metal on its underside and by the underside of the upper section of the belt conveyor on its upper side.

10. The transport device of claim 7, wherein the pocket is limited by the support sheet metal on its upper side and by a plate-shaped support element that is rigidly arranged on the adjacent transport element on its underside.

11. The transport device of claim 8, wherein the upper side of the support plate contains at least one preferably groove-shaped recess for accommodating an elongated guide element with said recess extending transverse to the transport direction of the transport device and in the transport direction of the belt conveyor.

12. The transport device of claim 11, wherein the guide element is a V-belt.

13. The transport device of claim 11, wherein, if only one guide element is provided, the guide element is in the transport direction of the transport device arranged on an end section of the transport element on which no pocket is arranged.

14. The transport device of claim 1, wherein the support plates are realized elastically.

15. The transport device of claim 14, wherein the support plates consist of a rubber material that is reinforcable.

16. The transport device of claim 14, wherein the support plates includes thin sheet metal.

17. The transport device of claim 14, wherein the support plates includes sheet steel.

* * * * *